(12) United States Patent
Coleman et al.

(10) Patent No.: US 10,084,534 B2
(45) Date of Patent: *Sep. 25, 2018

(54) STATE TRANSFER AMONG VIRTUALIZATION-ENABLED SATELLITE PLATFORMS

(71) Applicant: Vector Launch Inc., Tucson, AZ (US)

(72) Inventors: Shaun Coleman, San Jose, CA (US); Darren D. Garber, Rancho Palos Verdes, CA (US)

(73) Assignee: Vector Launch Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,978

(22) Filed: Jan. 2, 2018

(65) Prior Publication Data
US 2018/0123681 A1 May 3, 2018

Related U.S. Application Data

(63) Continuation of application No. 15/459,472, filed on Mar. 15, 2017, now Pat. No. 9,876,563, which is a
(Continued)

(51) Int. Cl.
*H04B 7/185* (2006.01)
*H04L 12/24* (2006.01)
(Continued)

(52) U.S. Cl.
CPC ..... *H04B 7/18519* (2013.01); *G06F 9/45558* (2013.01); *H04B 7/18521* (2013.01);
(Continued)

(58) Field of Classification Search
CPC .................. H04B 7/18521; H04B 7/18523
(Continued)

(56) References Cited

U.S. PATENT DOCUMENTS 5,722,042 A 2/1998 Kimura et al.
5,724,345 A 3/1998 Guarneri et al.
(Continued)

FOREIGN PATENT DOCUMENTS

CN 101459946 A 6/2009
CN 104902515 A 6/2009
(Continued)

OTHER PUBLICATIONS

Notification of Transmittal of the International Search Report and the Written Opinion of the International Searching Authority, or the Declaration received in International Application No. PCT/US2016/059623, dated Jan. 9, 2017, 12 pages.
(Continued)

*Primary Examiner* — John J Lee

(57) ABSTRACT

Systems, methods, and software described herein provide enhancements for deploying applications in satellite systems. In one example, a satellite system comprises a communication interface configured to receive software payloads, and a satellite control system configured to operate logistical control elements of the satellite system. The satellite system further comprises a virtualized execution system configured to execute ones of the software payloads deployed on the satellite system as associated virtual nodes that share resources of the satellite system.

20 Claims, 11 Drawing Sheets

Related U.S. Application Data continuation of application No. 15/297,436, filed on Oct. 19, 2016, now Pat. No. 9,641,238.

(51) Int. Cl.
   *H04L 29/08* (2006.01)
   *G06F 9/455* (2018.01)

(52) U.S. Cl.
   CPC .......... *H04L 41/0668* (2013.01); *H04L 67/10* (2013.01); *H04L 67/1078* (2013.01); *H04L 67/34* (2013.01); *G06F 2009/45579* (2013.01); *G06F 2009/45583* (2013.01); *H04L 67/125* (2013.01)

(58) Field of Classification Search
   USPC .......... 455/430, 3.02, 427, 428, 452.1, 12.1, 455/13.3
   See application file for complete search history.

(56) References Cited

U.S. PATENT DOCUMENTS

| | | | |
|---|---|---|---|
| 5,886,991 | A | 5/1999 | Guarneri et al. |
| 5,925,092 | A | 7/1999 | Swan et al. |
| 6,178,163 | B1 | 1/2001 | Yuan et al. |
| 6,301,476 | B1 | 10/2001 | Monte et al. |
| 6,985,454 | B1 | 1/2006 | Wiedeman et al. |
| 7,151,929 | B1 | 12/2006 | Jenkin et al. |
| 7,463,890 | B2 | 12/2008 | Hertz et al. |
| 7,992,134 | B2 | 8/2011 | Hinchey et al. |
| 8,140,816 | B2 | 3/2012 | Hofer et al. |
| 8,286,187 | B2 | 10/2012 | Hou et al. |
| 8,706,869 | B2 | 4/2014 | Campion et al. |
| 8,730,864 | B2 | 5/2014 | Natarajan et al. |
| 8,797,969 | B1 | 8/2014 | Harel et al. |
| 8,819,659 | B2 | 8/2014 | Ramer |
| 9,014,241 | B2 | 4/2015 | Dick |
| 9,030,355 | B2 | 5/2015 | Jarvis et al. |
| 9,042,295 | B1 | 5/2015 | Balter et al. |
| 9,335,417 | B2 | 5/2016 | Kim et al. |
| 9,442,476 | B2 | 9/2016 | Bliss et al. |
| 9,577,704 | B2 | 2/2017 | Baller et al. |
| 9,641,238 | B1 | 5/2017 | Coleman et al. |
| 9,654,204 | B2 | 5/2017 | Ling et al. |
| 2002/0150060 | A1 | 10/2002 | Montpetit |
| 2003/0185215 | A1* | 10/2003 | Wright ................ H04L 29/06 370/395.5 |
| 2003/0203717 | A1 | 10/2003 | Chuprun et al. |
| 2004/0157598 | A1 | 8/2004 | Parkman et al. |
| 2004/0219879 | A1 | 11/2004 | Stephenson |
| 2005/0050538 | A1 | 3/2005 | Kawamata et al. |
| 2006/0130056 | A1 | 6/2006 | Bozak et al. |
| 2008/0155610 | A1 | 6/2008 | Rosen |
| 2008/0252514 | A1 | 10/2008 | Rigal et al. |
| 2008/0307466 | A1 | 12/2008 | Wang |
| 2009/0042562 | A1* | 2/2009 | Treesh ............... H04B 7/18513 455/428 |
| 2009/0051589 | A1 | 2/2009 | Schiff et al. |
| 2010/0058328 | A1 | 3/2010 | DeHaan |
| 2011/0044236 | A1 | 2/2011 | Giffen et al. |
| 2011/0196451 | A1 | 8/2011 | Hill |
| 2012/0020280 | A1 | 1/2012 | Jansson et al. |
| 2012/0197552 | A1 | 8/2012 | Robinson et al. |
| 2012/0284716 | A1 | 11/2012 | Martins et al. |
| 2013/0141307 | A1 | 6/2013 | Nurnberger et al. |
| 2013/0194132 | A1 | 7/2013 | Kim et al. |
| 2013/0275036 | A1 | 10/2013 | Olivier et al. |
| 2013/0275975 | A1 | 10/2013 | Madsuda et al. |
| 2013/0305218 | A1 | 11/2013 | Hirsch et al. |
| 2013/0336168 | A1 | 12/2013 | Schlipf et al. |
| 2014/0039963 | A1 | 2/2014 | Augenstein et al. |
| 2014/0068546 | A1 | 3/2014 | Balasubramanian et al. |
| 2014/0201218 | A1 | 7/2014 | Catalano et al. |
| 2014/0297874 | A1 | 10/2014 | Matsubara et al. |
| 2015/0078178 | A1 | 3/2015 | Carides et al. |
| 2015/0199197 | A1 | 7/2015 | Maes et al. |
| 2015/0215030 | A1 | 7/2015 | Moore |
| 2015/0219744 | A1 | 8/2015 | Eikenberry et al. |
| 2015/0247928 | A1 | 9/2015 | Waters et al. |
| 2015/0318916 | A1 | 11/2015 | Gopal et al. |
| 2016/0009425 | A1 | 1/2016 | Thompson et al. |
| 2016/0037434 | A1 | 2/2016 | Gopal et al. |
| 2016/0080072 | A1 | 3/2016 | Baudoin et al. |
| 2016/0132805 | A1 | 5/2016 | Delacourt et al. |
| 2016/0226150 | A1 | 8/2016 | Paleta et al. |
| 2016/0242024 | A1 | 8/2016 | Karren et al. |
| 2016/0283424 | A1* | 9/2016 | Richardson ........... G06F 13/362 |
| 2016/0314057 | A1 | 10/2016 | De Oliveira et al. |
| 2016/0380909 | A1 | 12/2016 | Antony et al. |
| 2017/0021947 | A1 | 1/2017 | Pelligrino et al. |
| 2017/0026110 | A1 | 1/2017 | Richardson et al. |
| 2017/0091047 | A1 | 3/2017 | Banalore et al. |
| 2017/0195040 | A1 | 7/2017 | Sobhani et al. |
| 2017/0250751 | A1 | 8/2017 | Kargieman et al. |

FOREIGN PATENT DOCUMENTS

| | | |
|---|---|---|
| CN | 105471493 | 4/2016 |
| KR | 20130131652 A | 12/2013 |
| WO | 1996003823 A1 | 2/1996 |
| WO | 2014022810 A1 | 2/2014 |
| WO | 2015198303 A1 | 12/2015 |
| WO | 2017023621 A1 | 2/2017 |
| WO | 2017027602 A1 | 2/2017 |

OTHER PUBLICATIONS

Panunzio, Marco et al. "An Architectural Approach with Seperation of Concerns to Address Extra-Functional Requirements in the Development of Embedded Real-Time Software Systems". Journal of Systems Architecture. 2014.

"Describing and Deploying Satellite Behaviors Using Rules-Based Statecharts". Kenneth B. Center. PnP Innovations. 2014.

Romer, Kay et al. "The Design Space of Wireless Sensor Networks". Wireless Sensor Networks. IEEE Wireless Communications, vol. 11, Issue 6. 2004.

\* cited by examiner

STATE TRANSFER AMONG VIRTUALIZATION-ENABLED SATELLITE PLATFORMS

RELATED APPLICATIONS

This patent application is a continuation of, and claims priority to, U.S. patent application Ser. No. 15/297,436 that was filed on Oct. 19, 2016, and is entitled "VIRTUALIZATION-ENABLED SATELLITE PLATFORMS," and U.S. patent application Ser. No. 15/459,472 that was filed on Mar. 15, 2017, and is entitled "VIRTUALIZATION-ENABLED SATELLITE PLATFORMS," which are hereby incorporated by reference into this patent application.

BACKGROUND

Satellites can be deployed into orbit to provide various space-based operations, such as military and civilian observation operations, communications operations, navigation operations, weather operations, and research operations. Satellites can include various sensors and communication equipment that are used to perform desired tasks. For example, a weather satellite may include one or more cameras or imaging sensors that can be used to take images of Earth, and communication equipment that can be used to communicate the images to a control system on Earth. Although satellites can be configured to perform these specialized operations, satellites are expensive to create and launch into orbit, especially for organizations that may not require the use of an entire satellite with a large number of sensors, or may not require continuous operations on the satellite. As a result, organizations may avoid the use of satellites, limiting the use of promising satellite technology.

OVERVIEW

The technology disclosed herein provides enhancements for deploying applications to orbiting satellites. Systems, methods, and software described herein provide enhancements for deploying applications in satellite systems. In one example, a satellite system comprises a communication interface configured to receive software payloads, and a satellite control system configured to operate logistical control elements of the satellite system. The satellite system further comprises a virtualized execution system configured to execute ones of the software payloads deployed on the satellite system as associated virtual nodes that share resources of the satellite system.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
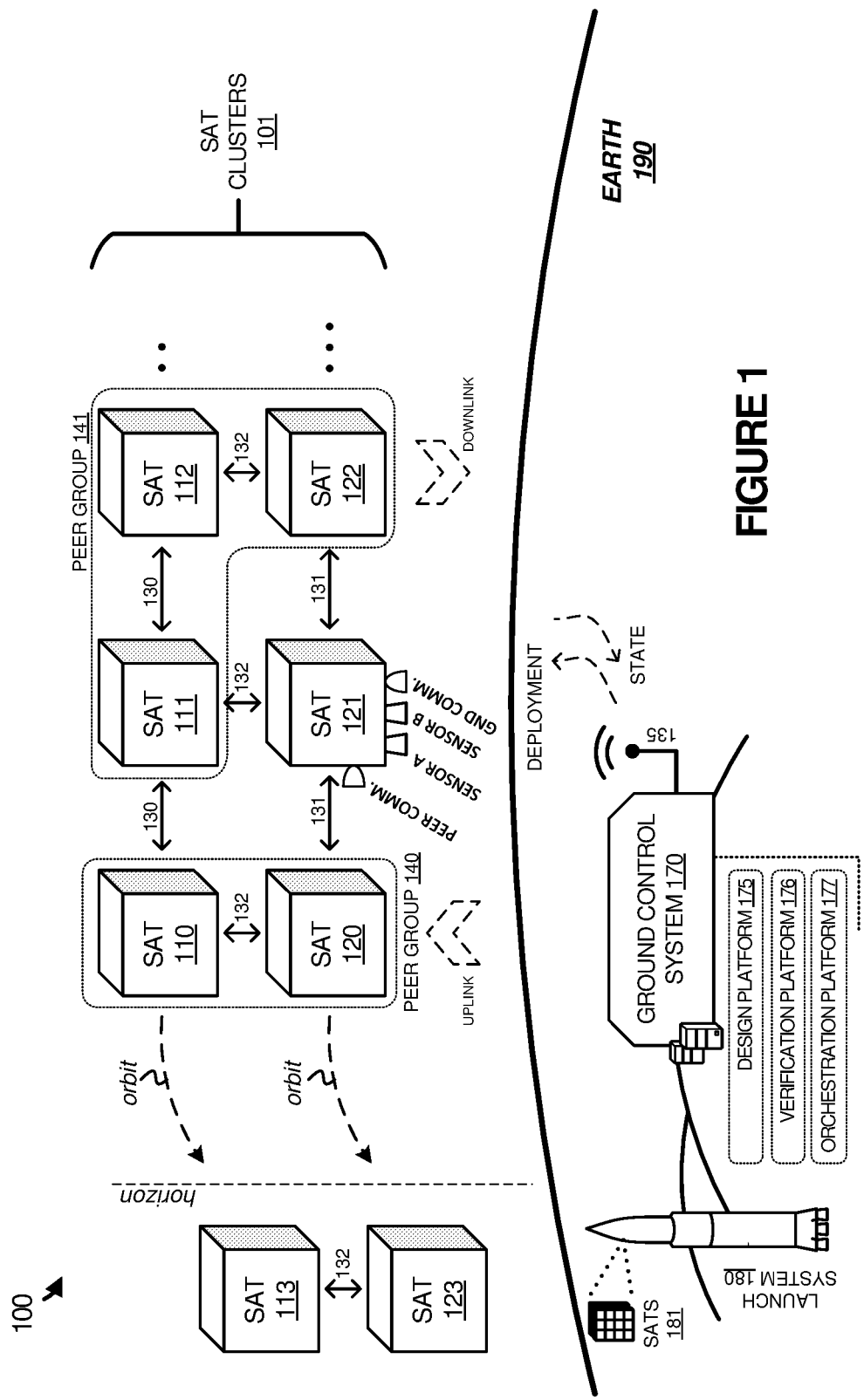
FIG. 1 illustrates a satellite environment according to an implementation.

The various examples disclosed herein provide enhancements for satellite hardware and software technology. In particular, the examples disclosed herein provide systems and methods for deploying software applications to an orbiting satellite platform, wherein each of the software applications executes as a virtual node that can share resources with one or more other applications deployed to the same satellite. These virtual nodes may comprise full operating system virtual machines in some examples, and may further include virtual containers. These containers may include Docker containers, Linux containers, jails, or another similar type of virtual containment node, which can provide an efficient management of resources from a host system. The resources used by the containers may include kernel resources from the host computing system, and may further include repositories and other approved resources that can be shared with other containers or processes executing on the host. However, although resources may be shared between the containers on a host satellite, the containers are provisioned to have private access to the operating system with their own identifier space, file system structure, and network interfaces.

In the present example, to provide the satellite platform, a plurality of satellites may be deployed, wherein organizations may generate applications and deploy the applications to the satellites to perform desired operations. These operations may include military and civilian observation operations, communications operations, navigation operations, weather operations, and research operations. To develop the applications, a development platform may be provided that permits the organizations to develop software applications using a development tool. Once developed using the tool, the applications may be executed in a virtual or physical test environment replicating the physical satellite platform. This test environment may permit the user to upload the software application to one or more test satellites and monitor the operation of the application prior to deploying the application to the physical satellite cluster. In some implementations, in developing the application, the provided development tool may include an application programming interface (API) or some other command structure, which permits the applications to request and access the various sensors and interfaces provided by the physical satellite. Accordingly, although each of the software applications may perform different operations, they may interact with sensors, such as cameras, antennas, and the like using similar commands.

Once an application is developed using the development tool and the test environment, the application may then be deployed in one or more satellites of the orbiting satellite platform. In some implementations, the application may be provided to each of the one or more satellites using a ground control system as an uplink to the one or more satellites. In other implementations, a single uplink may be made to a satellite in the platform, wherein the satellite is configured to distribute the application to other desired satellites in the platform. Once deployed in the environment, the application may execute on the assigned satellites.

In some implementations, to manage the execution of the applications on each of the satellites, a schedule may be generated, wherein the schedule may be responsible for scheduling the processing of each of the applications, as well as the access for each of the applications to the user sensors. For example, a first application on a satellite may require access to an imaging sensor during a first time period, while a second application may require access to the same sensor during a second time period. The schedule provided to the satellite may be used to determine and allocate addressing links between each of the applications to the sensor based on the defined time periods. In at least one implementation, more than one applications may be allocated to the same sensor at any one time. This may permit applications providing different operations to receive the same data, but provide different functionality in relation to the data. In other implementations, a single application may prefer that no other applications receive are access the sensor at the same time. Thus, the schedule may ensure that only a single application is allocated or capable of communicating with the sensor during the defined time period.

In some implementations, the satellites of the satellite platform may each exchange state information with one or more other satellites and the ground control system for the platform. This state information may include current operational state information for each of the applications, such as the tasks or processes that are operating, and may further exchange data generated at least partially from the sensors of the satellite. This data may be used in a peer group, wherein a first satellite may identify a first set of data, and provide the data to a second satellite. The second satellite may then identify second data and, process the first and second data as defined by the application. This operation may be used, as an example, in imaging operations, wherein a first satellite may take images of an object over a first period of time, and provide data for the images to the second satellite. The second satellite may take subsequent images and use the data for the first images and the subsequent images to make a determination about an object. Although this is one example, it should be understood that other operations may use peer sharing of state data to identify characteristics about measured data from the satellite sensors.

FIG. 1 illustrates a satellite environment 100 according to an implementation. Satellite environment 100 includes satellites 110-113, satellites 120-123, Earth 190, ground control system 170, and launch system 180. Satellites 110 and 120 belong to a first peer group 140, and satellites 111, 112, and 122 belong to second peer group 141, wherein the peer groups may be used to share state information, such as application state and data for the applications executing thereon. Satellites 110-113 and satellites 120-123 communicate via wireless communication links 130-132. Ground control system 170 communicates with satellites 110-113 and satellites 120-123 using wireless communication link 135.

As described herein, a plurality of satellites 110-113 and 120-123 may be launched and deployed as an orbiting platform for a plurality of different software applications. To generate the applications, design platform 175 is provided, which may include various tools and APIs that permit organizations to generate the software applications. In some implementations, design platform 175 may provide users with selectable functions and interface elements that are available on each of the satellites. Using the functions and available interface elements, the developer or developers for a particular organization may generate a software application that performs desired operations. For example, a developer may generate an application that uses a camera on a satellite to track movements of relevant objects.

Once the application is developed, the application may be provided to verification platform 176, which can be used to verify and test the application before deploying the application to the satellite platform. Verification platform 176 may comprise a physical or virtual testbed, wherein the application can be deployed to one or more test satellites to determine the functionality of the application. In some implementations, in addition to testing the functionality, verification platform may further apply tests to the application to ensure that the application is approved for operating on the physical platform. These tests may include, but are not limited to, ensuring the application is not malicious to other applications that may execute on the same satellite, ensuring the application does not change the flight structure or operations of the satellite, ensuring the data is properly communicated between other satellites and the ground control system, or any other similar tests to verify the operation of the application.

After the application is verified, orchestration platform 177 may be used as part of ground control system 170 to schedule the application in the orbiting cluster. This scheduling may be used to identify which of the satellites apply to the generated applications, the processing resources that can be allocated to application, any security requirements for the application when being deployed with other applications, or some other similar scheduling requirement. Once the requirements are defined, a schedule may be determined based on the requirements, wherein the schedule may allocate one or more satellites for the operation of the application, as well as a processing schedule on the satellite. For example, the application may only require operation on one side of Earth 190. Consequently, orchestration platform 177 may generate a schedule that permits processing for the application when the satellite is geographically located on a specific side of Earth 190.

Although the examples provided above include one version of generating a schedule, it should be understood that other information may be used in determining the schedule of operation for the application. For example, the developer of an application may supply a cost constraint, which could be used in allocating the processing resources and user sensors on the satellite. In other implementations, the developer may provide requirements, such as sensor security, and processing requirements, and be provided with a list of available satellites that provide the required criteria. From the list, the developer may then select the time and satellites that are desired, and approve the application for deployment to the satellite platform.

Once an application has been approved to be deployed to the satellites of the satellite platform, ground control system 170 may initiate an uplink with one or more of the satellites to provide the application to the satellites, as well as update any scheduling information for the satellites. Once uploaded to the desired satellites, the application may begin execution based on the scheduling determined at orchestration platform 177. In some implementations, the uplink from ground control system 170 may be solely responsible for providing the applications to the required satellites. In other implementations, ground control system 170 may supply an application to a first set of satellites, which may then distribute the application to one or more other satellites of the satellite platform. For example, ground control system 170 may provide a first application to satellite 120, wherein satellite 120 may, in turn supply the application to other satellites in a peer group. In particular, satellite 120 may provide the application to satellite 110 that is in the same peer group, permitting satellite 110 to provide operations of the application without directly receiving the communication from ground control system 170. Additionally, similar to providing the initial configuration to the satellites, ground control system 170 may further be used to supply updates to each of the applications operating in the satellite platform, and may further update any scheduling information on each of the satellites.

Also illustrated in satellite environment 100 is launch system 180, which may be used to transport satellites (sats) 181 into orbit with orbiting satellites 110-113 and 120-123. Satellites 181 include a hardware and software configuration that permits applications to execute as virtual nodes on the satellites. In some implementations, satellites 181 may be launched using launch system 180 without applications, and instead may be provided with a base operating system or hypervisor that can be used to load and execute applications as they are provided in an uplink from ground control system 170. In other implementations, satellites 181 may be configured with a first set of applications capable of being executed via an operating system or hypervisor on the satellites. Thus, once into orbit, the applications may initiate execution to provide the operations of the applications. These applications may further be added to, removed, and modified based on information provided in the uplink from ground control system 170.

Figure 2:
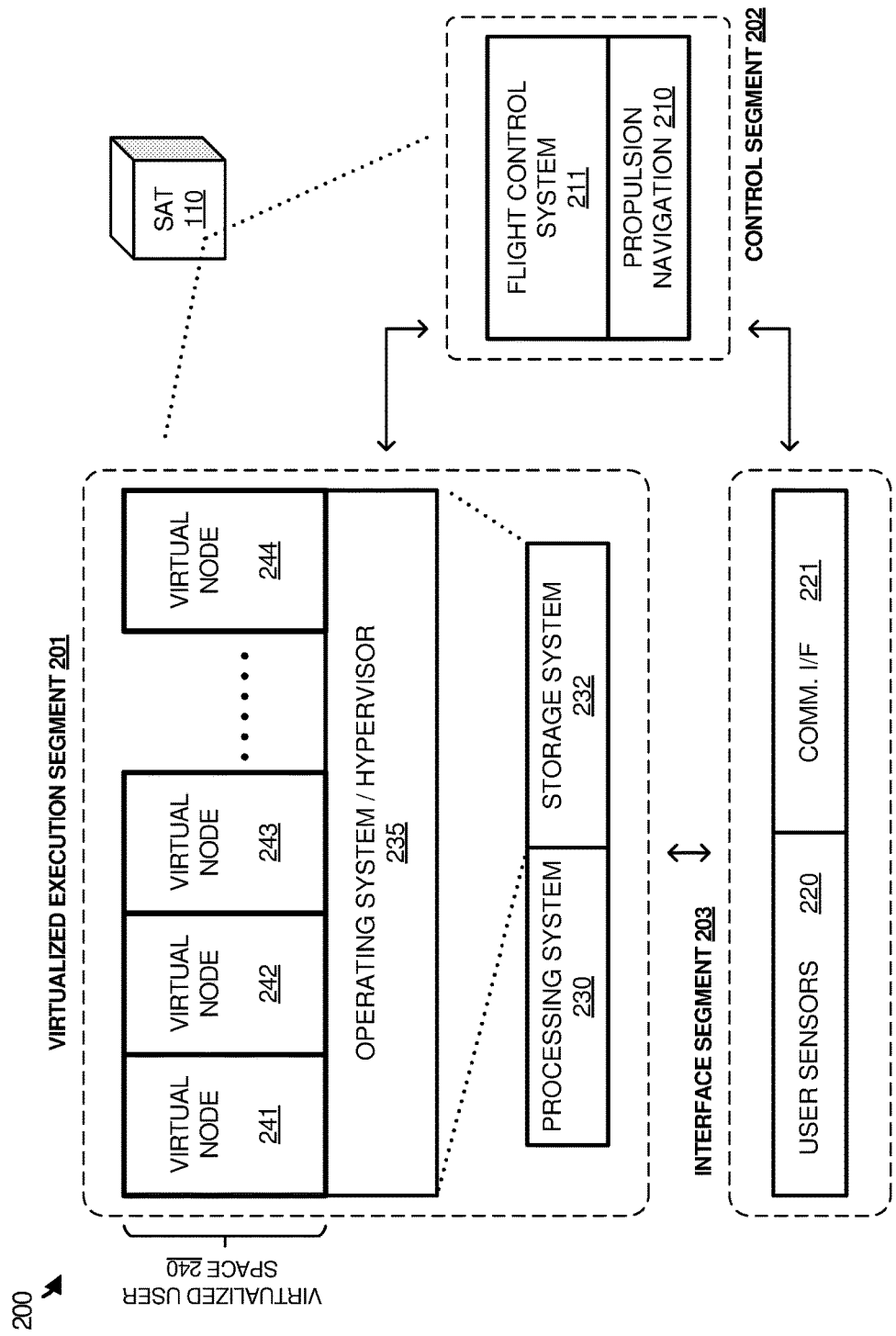
FIG. 2 illustrates an expanded view of a satellite capable of providing a platform for virtual nodes according to an implementation.

FIG. 2 illustrates an expanded view 200 of a satellite 110 capable of providing a platform for virtual nodes according to an implementation. Satellite 110 includes virtualized execution segment 201, control segment 202, and interface segment 203, which may be coupled using various communication links. Virtualized execution segment 201 is representative of a virtualized execution system, which includes a virtualized user space 240 for virtual nodes 241-244, an operating system or hypervisor 235, a storage system 232 to store the operating system and virtual user space, and a processing system 230. Control segment 202 further includes flight control system 211 and propulsion navigation 210. Interface segment 203 further includes user sensors 220 and communication interface 221, wherein communication interface 221 may be used for ground communication and inter-satellite communication. User sensors 220 may include imaging sensors, temperature sensors, light sensors, or some other similar sensor capable of interaction with virtual nodes 241-244.

As described herein, organizations may generate applications that are capable of being deployed as virtual nodes on one or more satellites of a satellite platform. These applications may be provided from a ground control system, or may be provided from another satellite via communication interface 221 on satellite 110. Once the applications are provided, operating system/hypervisor 235, which is stored on storage system 232 and executed by processing system 230 may provide a platform for the execution of the applications. Here, each application provided to satellite 110 is executed as a separate virtual node in virtual nodes 241-244, wherein the virtual nodes may comprise full operating system virtual machines or containers capable of sharing resources from the underlying operating system in storage system 232.

To manage the execution of the virtual nodes, operating system/hypervisor 235 may manage a schedule that is used to allocate processing resources of processing system 230 to each of the nodes, user sensors 220 to each of the nodes, and other similar resources on satellite 110. In particular, the schedule may be used to ensure that each application is scheduled to receive processing resources from processing system 230 during defined time periods, and receive access to user sensors 220 during defined time periods. In some implementations, one or more of the applications may execute during the same time period on satellite 110. These applications may use different sensors in user sensors 220, may time share the use of sensors in user sensors 220, or may use the same data from user sensors 220 in their operation. To allocate the sensors operating system 235 may be responsible for providing each operating virtual node with a communication link to the required user sensor, and deallocating or removing the communication link to the required sensor based on the scheduling. For example, an imaging device may be accessed by virtual node 241 during a first time period, wherein virtual node 241 may access the sensor based on addressing information provided by operating system 235. Once the time period expires, operating system 235 may prevent virtual node 241 from accessing the sensor, in some examples, by removing the addressing access of the virtual node, and allocating access of the sensor to a second virtual node.

In addition to the virtual node operations provided in virtualized execution segment 201, satellite 110 further includes control segment 202. Control segment 202, which may be communicatively linked to virtualized execution segment 201 and interface segment 203, is responsible for logistical control elements of the satellite of satellite 110. These operations may include managing the deployment of solar panels on the satellite, managing the positioning of the satellite with regards to the Earth or the sun, or any other similar operation. In at least one example, flight control system 111 may monitor for requests from operating system 235, and determine whether the satellite is capable of accommodating the request from operating system 235. For example, virtual node 241 may generate a request to move a user sensor, which also requires movement using propulsion and navigation 210. In response to the request, flight control system 211 may determine that the movement cannot be made, and may prevent the movement of the satellite using propulsion and navigation 210. Further, in some implementations, flight control system 211, may provide a notification to operating system 235 and virtual node 241 indicating that the movement is not permitted.

Although illustrated as a separate system in the example of FIG. 2, it should be understood that in some examples, flight control system may be implemented and stored on processing system 230 and storage system 232. However, it should also be understood that flight control system may be stored on a separate storage system and use a different processing system than operating system 235 and its corresponding virtual nodes.

Figure 3:
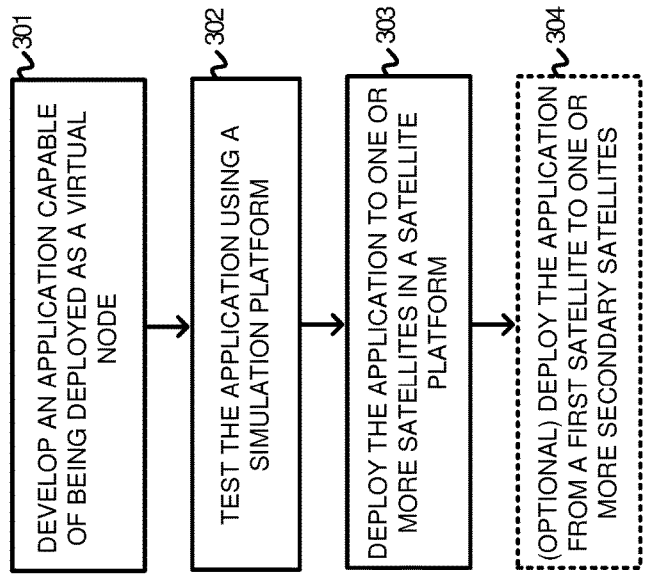
FIG. 3 illustrates an operation of deploying satellites capable of providing a platform for virtual nodes according to an implementation.

FIG. 3 illustrates an operation of deploying satellites capable of providing a platform for virtual nodes according to an implementation. The operations in FIG. 3 are referenced parenthetically in the paragraphs that follow with reference to systems and objects of satellite environment 100 of FIG. 1.

As depicted, the operation includes developing (301) an application capable of being deployed as a virtual node in one or more satellites of a satellite platform. To develop the applications, design platform 175 may be provided to the developer that includes tools and APIs that permit the application to use and access sensors on the satellite to retrieve desired data. Once the application is developed using design platform 175, the developer will test (302) the application using a simulation platform, represented in FIG. 1 by verification platform 176, wherein the verification platform may provide a physical or virtual simulation platform to monitor the operations of the application. Further, verification platform 176 may provide various tests to ensure that the application will not interfere with other cooperating applications, or cause any issues with the flight of the satellite itself.

Once tested, the application may be deployed (303) to one or more satellites in the satellite platform. In some examples, to deploy the application to the satellites, the application may require a schedule, wherein the schedule may be determined based on the task and budget requirements of the developer of the application. In at least one implementation, the user may provide geographic areas of interest, operation times of interest, budget constraints, or any other similar variables, including combinations thereof, to orchestration platform 177. Once the variables are provided, the user may select from a pool of available satellites and operation times to implement the desired task. Once scheduled, the application may be deployed to one or more satellites in the satellite platform via ground control system 170. After being deployed along with an updated schedule for each of the satellites, the application may execute as a virtual node alongside one or more applications on the same satellite.

As an optional operation, as illustrated in FIG. 3, the application may further be deployed (304) from a first satellite to one or more secondary satellites. This deployment across the satellites permits ground control system 170 to upload the application fewer times to the satellite platform, and instead permits the applications themselves to distribute or deploy the applications to other satellite nodes in the platform. For example, ground control system 170 may deploy an application to satellite 122. In turn, satellite 122 may deploy the application to satellites 111-112 to generate peer group 141 for the application. Thus, instead of relying on ground control system 170 to provide applications to the individual satellites, the satellites themselves may deploy applications throughout the satellite platform.

Figure 4:
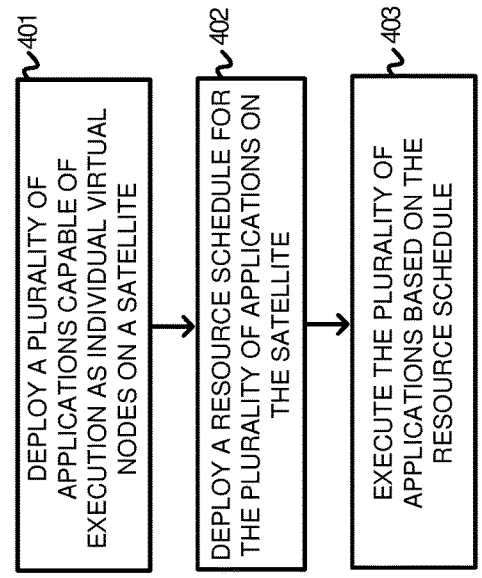
FIG. 4 illustrates an operation of deploying virtual applications in a satellite according to an implementation.

FIG. 4 illustrates an operation of deploying virtual applications in a satellite according to an implementation. The operations in FIG. 3 are referenced parenthetically in the paragraphs that follow with reference to systems and objects of computing environment 100 of FIG. 1. In particular, the operations of FIG. 4 will be described with reference to satellite 110 of FIGS. 1 and 2.

As illustrated in FIG. 4, the operation includes deploying (401) a plurality of applications capable of execution as individual virtual nodes on satellite 110. These virtual nodes may include full operating system virtual machines in some examples, but may also comprise containers, such as Docker and Linux containers in some instances. These applications may be provided to satellite 110 using ground control system 170, and may also be provided via other satellites orbiting in the satellite platform. In addition to the applications, the operation further includes deploying (402) a resource schedule for the plurality of applications on satellite 110, wherein the resource schedule is used to schedule user sensor availability and processing system resources to each of the applications. This scheduling of resources may include time division scheduling in some examples, wherein two applications may be prevented from accessing the processing system and/or a sensor at any one instance. For example, a first application operating as virtual node 241 may execute during a first time period on processing system 230, whereas a second application operating as virtual node 242 may execute during a second time period on processing system 231. In addition to or in place of time resource scheduling, applications may further be provided with hardware resource scheduling, which may be used to provide the physical hardware of satellite 110 to multiple applications at any one instance. For example, a first application operating as virtual node 241 may execute using a first processing core of processing system 230, whereas a second application operating as virtual node 242 may execute using a second processing core of processing system 230.

Although these are some examples of time division and resource division that may be accomplished via the resource schedule provided to satellite 110, it should be understood that other combinations of time division and resource division may be provided via the resource schedule.

Once the applications and the resource schedule are provided to satellite 110, the operation further includes executing (403) the plurality of applications based on the resource schedule. In some implementations, once the schedule is provided, the schedule may be used by operating system 235 to determine the allocation and execution privileges of each of the virtual nodes. Accordingly, operation system 235, based on the schedule, may start and stop virtual machines, provide addressing to sensors to each of the virtual machines, establish security measures to prevent improper access of resources to the virtual machines, among other possible scheduling operations.

Figure 5:
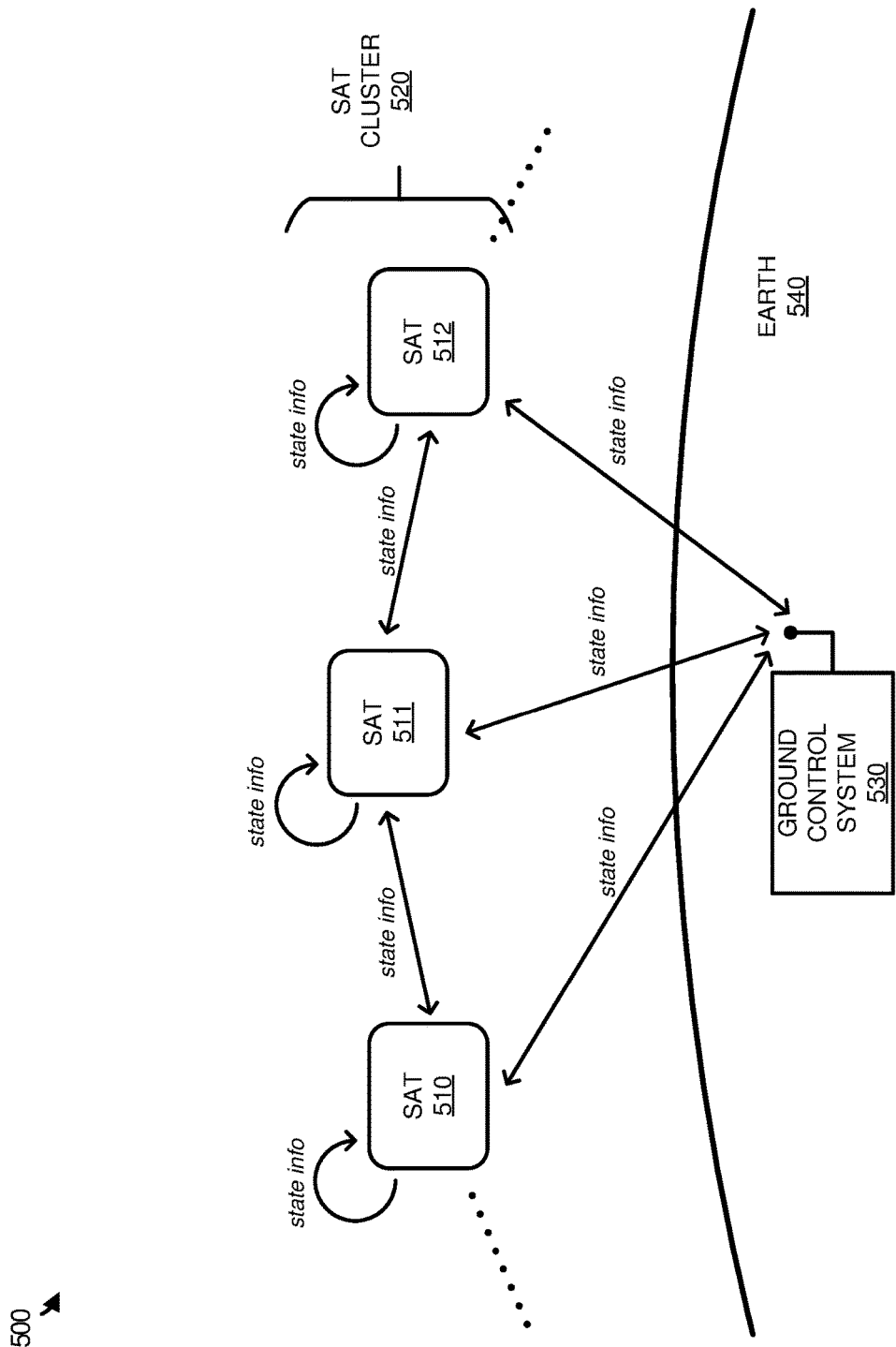
FIG. 5 illustrates a satellite system capable of providing state information between satellites according to an implementation.

Referring now to FIG. 5, FIG. 5 illustrates a satellite system 500 capable of providing state information between satellites according to an implementation. Operational scenario 500 includes satellite cluster 520 with satellites 510-512, and further includes ground control system 530 on Earth 540.

As described herein, a satellite platform may be deployed, wherein a plurality of satellites is capable of providing a processing space for software applications. In some implementations, the satellite platform can use state information to ensure that a backup is available in case of a failure of one of the satellites, and further can be used to communicate data for applications that execute across multiple satellites. Here, each of satellite of satellites 510-512 maintain local state information, communicate state information with at least one other satellite, and provide state information with ground control system 530.

In some implementations, satellite 510 may be configured with a first version of an application while satellite 511 is configured with a second version of the application. During the operation of the satellites, satellite 510 may maintain state information related to execution of the first application node and transfer the state information for delivery to satellite 511. Satellite 511 may receive the state data, and execute the second application node in accordance with the state information. This state data may include information about the processes being executed for the first application node, sensor data being retrieved for the first application node, or any other similar state information.

As a result of this configuration, in some examples, satellite 510 may maintain state information for the first application, such as processed and/or unprocessed imaging data, and transfer the state information to satellite 511. Satellite 511 may then modify the state information using the second version of the application, wherein modifying the state information may include adding additional sensor data from sensors 511, processing the sensor data from the first satellite and the second satellite, removing portions of the data from the first satellite, or providing some other similar operation of the data. Once the state information is modified, the state information may be communicated to satellite 512, or may be communicated to the ground control system. In some implementations, such as those with imaging sensors on satellites 510-512, the exchange of state information from a first satellite to a second satellite may be used by the second satellite to track at least one ground-based object of interest, or may be used to refine analysis of the state information, based on new sensor data, to act as a recognition process for at least one ground-based object of interest.

In some examples, in place of acting as a peer to modify the state information from the first application node on satellite 510, satellite 511 may be configured to operate as a backup for the first application on satellite 510. In particular, satellite 510 may provide state information to satellite 511, wherein the state information includes the current state of application 510. As the state information is provided to peer satellite 511, satellite 511 may identify a fault in the operational state of satellite 510. In response to identifying the failure, satellite 511 will identify a new peering node that is capable of executing at least one failed virtual node from satellite 510, and establish the new peering node based at least in part on the state information that was received from satellite 510. In some implementations, the new peering node may comprise satellite 511, however, it should be understood that the new peering node may comprise another satellite within the satellite platform.

Figure 6:
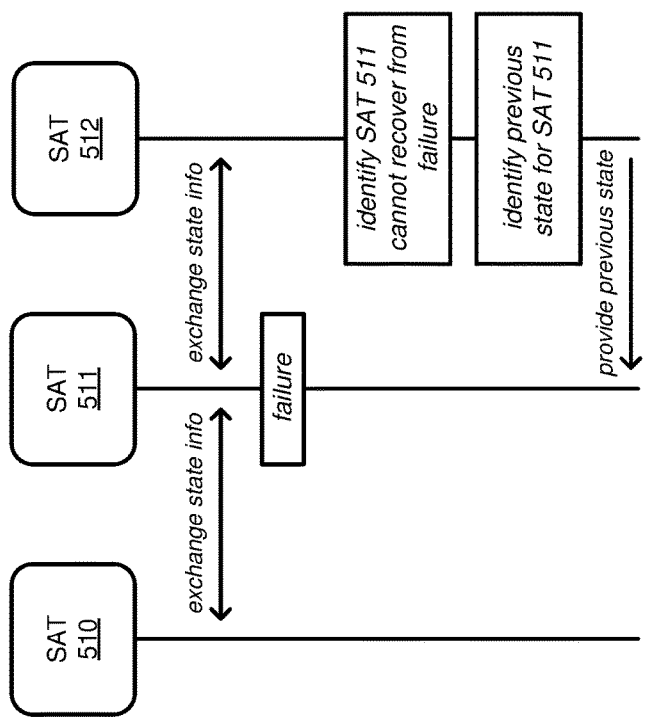
FIG. 6 illustrates a timing diagram of overcoming a failure of a satellite in a satellite cluster according to an implementation.

To further demonstrate the operations of satellite system 500, FIG. 6 is provided. FIG. 6 illustrates a timing diagram of overcoming a failure of a satellite in a satellite cluster according to an implementation. FIG. 6 includes satellites 510-512 from satellite system 500 of FIG. 5.

As illustrated in the present example, satellites 510-512 exchange state information, wherein the state information includes information about the current state of the applications executing on each of the nodes. This state information may include what applications are executing (scheduling information), what tasks or processes are executing for each of the applications, data from each of the applications, or some other similar state information. During the exchange of state information, satellite 511 encounters a failure, which may result from a variety of factors including, but not limited to, a hardware failure, a software failure, a solar event, or some other similar failure. Once the failure occurs, another satellite, in this example, satellite 512 identifies that satellite 511 is incapable of recovery from the failure, and identifies a previous state for satellite 511 prior to the failure. After the identification of the previous state, satellite 512 then provides the state to satellite 511, permitting satellite 511 to implement the previous state.

In some implementations, to exchange the state information between the satellites, each of the satellites may be configured to provide state information at defined intervals. These intervals may be defined by the applications themselves operating on the satellites, or may be defined by the operating system or hypervisor providing the platform for the applications. In some examples, the state exchange between satellites may be defined by the operating system and or the satellite platform provider, such that the provider may select, which satellites should be used in exchanging states. In other implementations, the applications may be used to define which satellites should be defined as a cluster for exchanging state information. For example, the application may exchange state information with other satellites that are used for executing versions of the application.

In at least one implementation, in identifying that satellite 511 cannot recover from a failure, satellite 512 may be configured to receive notifications from satellite 511 indicating whether satellite 511 is capable of operating without recovery state information from satellite 512. If satellite 511 indicates that it cannot recover, either through a direct notification or a lack of a notification, satellite 512 may identify the last state received and provide the state to satellite 511 for implementation. This providing of the state may include the state for all applications on satellite 511, or a portion of the state data associated with the applications that encountered a failure.

Figure 7:
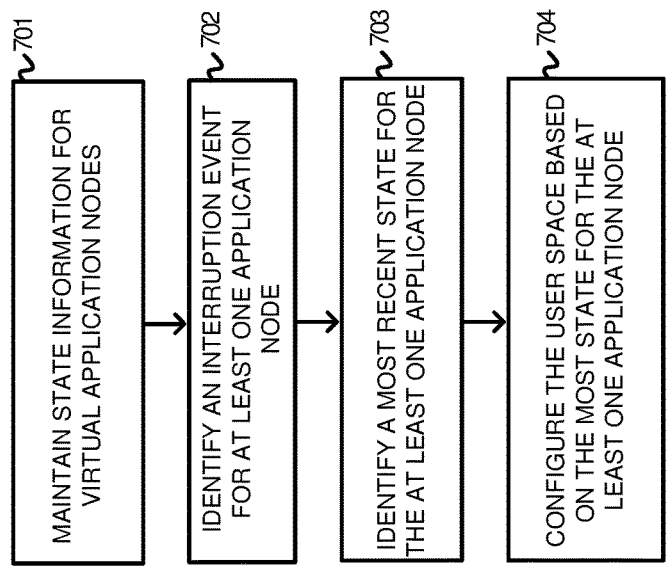
FIG. 7 illustrates an operation for overcoming a failure of at least one application node on a satellite according to an implementation.

FIG. 7 illustrates an operation for overcoming a failure of at least one application node on a satellite according to an implementation. The operations in FIG. 7 are referenced parenthetically in the paragraphs that follow with reference to systems and objects of satellite system 500 of FIG. 5. In particular, references will be made with a failure of satellite 511, however, it should be understood that similar operations may be provided by satellites 510 and 512 of the satellite system.

As depicted, the operations of satellite 511 include maintaining (701) local state information for virtual application nodes on satellite 511, wherein the application nodes may comprise full operating system virtual machines or virtual containers, and wherein the state information may comprise information about the processes executing for each of the applications and data retrieved for the executing processes. As the state information is collected for each of the virtual nodes, the operation further provides for identifying (702) an interruption event for at least one of the application virtual nodes. This interruption may comprise a software interruption or failure, a hardware interruption or failure, or an interruption due to a natural even, such as a solar flare or space debris. The interruption may be identified by the operating system or hypervisor for the application nodes, and may be identified due to a restart of the operating system or hypervisor, unusual or unpredictable activity from the application, the application reporting an issue to the operating system or hypervisor, or some other interruption identifiable event.

In response to identifying the interruption event for the at least one application node, the operation of satellite 511 further identifies (703) a most recent state for the at least one application node, and configures the user space based on the most recent state for the at least one application node (704). For example, as an application is executing on satellite 511, operational states may be maintained locally on the satellite, such that the states may be used to recover from a failure of at least one application node. These states may be stored on separate storage media of the satellite, or the same storage media as the primary applications, and may be updated at defined intervals. In response to identifying a failure for an application node executing on the satellite, a recent state may be identified that is stored on the satellite, and the application restored to the previous state. In some examples, this state update may include resuming processes that were executing prior to the failure. In other implementations, in addition to or in place of resuming processes for the application node, data may be refreshed on satellite 511 to place the at least one application in the previous state prior to the failure.

Figure 8:
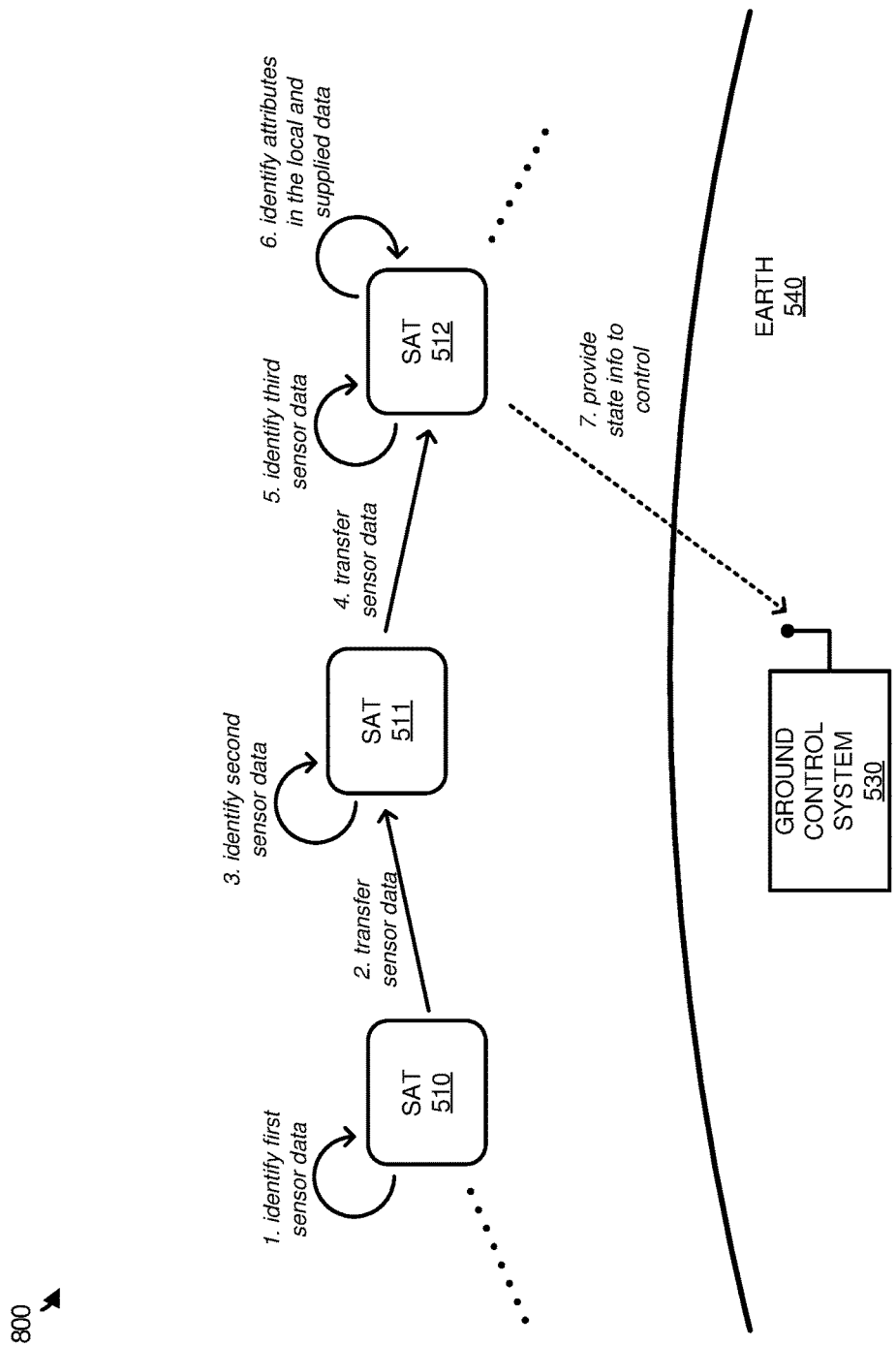
FIG. 8 illustrates an operational scenario of providing state information between satellites according to an implementation.

FIG. 8 illustrates an operational scenario 800 of providing state information between satellites according to an implementation. Operational scenario 800 includes systems and elements from satellite system 500 of FIG. 5. In particular, operational scenario 800 includes satellites 510-512, ground control system 530, and Earth 540 from satellite system 500 of FIG. 5.

In operation, satellites 510-512 may be configured with application nodes that can handoff operation data between satellites. This handoff permits the applications to continue operations on geographic features although a single satellite may be incapable with its defined orbit. For example, an application may be developed to take images and process the images over a particular geographic region. As a first satellite takes and processes the images, the satellite's orbit may move away from the geographic area of interest. As a result, the application on the first satellite may provide state information, or imaging data in the present example, to a second satellite, permitting the second satellite to continue the operations with respect to the geographic area of interest.

Here, as depicted in operational scenario 800, satellite 510, a step 1 identifies first sensor data, and transfers, at step 2, the sensor data to satellite 511. In some examples, the sensor data that is transferred from satellite 510 to satellite 511 may comprise raw sensor data, wherein the raw sensor data may comprise raw imaging files, heat mapping, light measurements, or some other sensor data from the sensors on satellite 510. Once received from satellite 510, satellite 511 may identify, at step 3 second sensor data, and transfer, at step 4, the sensor data and the second sensor data to satellite 512.

In some implementations, satellite 511 may be configured to perform operations on the combined data from satellite 510 as well as the local sensor data identified by satellite 511 to generate modified state data. For example, if the application were an imaging application, satellite 511 may use images obtained from satellite 510 and local images identified using one or more imaging sensors on satellite 511 in determining characteristics of the images. These characteristics may include the movement of objects in the images, physical changes in the objects of the images, or some other determination from the images. In some examples, the processed data may also be forwarded to satellite 512 with the raw data identified by satellites 510-511.

Once the data is received from satellite 511, satellite 512 may identify third sensor data, at step 5, and identify, at step 6, attributes of the received and locally identified state data. Referring back to the imaging data example, satellite 512 may use the imaging data obtained from sensors on satellites 510-511, as well as local imaging data obtained from sensors 512 to identify attributes within the images. This may permit satellite 512 to identify characteristics or attributes within a particular geographic area that may not have been capable of identification with the information solely from the sensors of satellite 512.

In some examples, the information that is transferred between the satellites may include identifiable characteristics from the previous satellite. These characteristics may include information that was obtained via the processing of the sensor data at that particular satellite. For instance, satellite 510 may identify an object of interest within a geographic region, and communicate characteristics of the object to satellite 511. These characteristics may include the shape of the object, the location of the object, or any other similar characteristics of the object. Based on the information from satellite 510, and in some examples any raw data provided from satellite 510, satellite 511 may identify additional characteristics of the object of interest. These characteristics may include the movement of the object, any shape or color changes of the object, or any other similar characteristics. Further, in addition to or in place of satellite 511 identifying characteristics for the object, satellite 511 may forward raw data and identified characteristics to satellite 512. This permits satellite 512 to identify attributes within the raw data based at least in part on attributes identified by satellites 510-511.

As further illustrated in operational scenario 800, as attributes or characteristics are identified by the satellites, the data may be reported to ground control system 530 as state information. This state information may include only relevant data related to the identified attributes of the sensor data, but may also include at least a portion of the raw sensor data in some examples. Further, while only illustrated as satellite 512 reporting state data to ground control system 530, it should be understood that state data may be provided from any of satellites 510-511 to ground control system 530.

Figure 9:
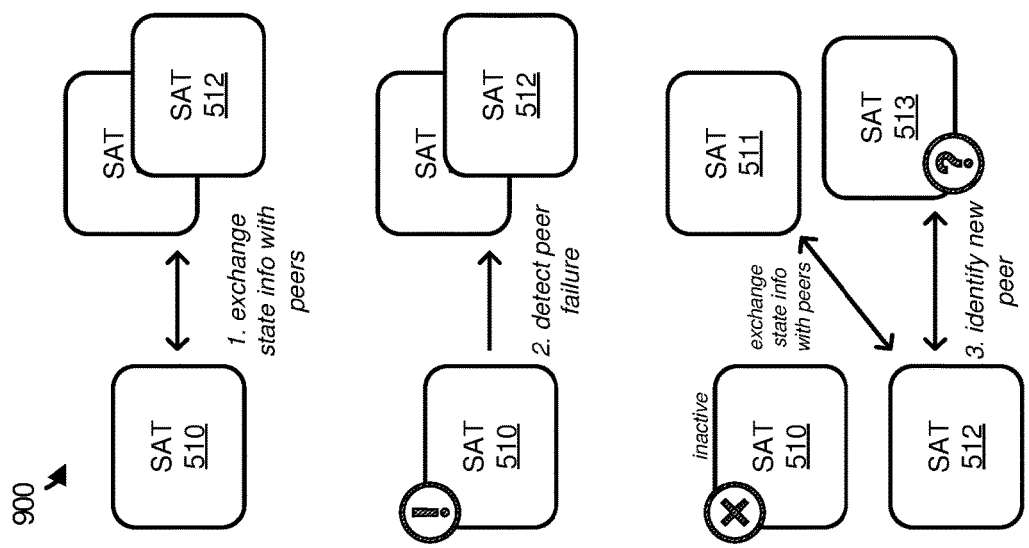
FIG. 9 illustrates an operational scenario of generating a new peer in response to a satellite failure according to an implementation.

FIG. 9 illustrates an operational scenario 900 of generating a new peer in response to a satellite failure according to an implementation. Operational scenario 900 includes systems and elements from satellite system 500 of FIG. 5. In particular, operational scenario 900 includes satellites 510-512 and further includes new satellite 513.

As described herein, satellites within a satellite platform may be grouped into peer clusters, wherein the peer clusters exchange state information for virtual nodes executing on each of the satellites. This state information may include images for the applications executing on the nodes, processes executing for the individual applications, sensor data for the applications, or any other similar information. As illustrated in operational scenario 500, satellites 510-512 may exchange, at step 1, state information for the applications executing thereon. While exchanging the state information, at least one of satellite 511 or satellite 512 may identify a failure with satellite 510. This failure may be a result of a hardware failure, a software failure, or some other similar type of failure, wherein at least one of the virtual nodes may be incapable of operation. In response to identifying the failure, which may be detected when satellite 510 reports a failure or when state notifications are not received from satellite 510, a new satellite 513 may be added to the peer cluster, at step 3, for the exchange of state information.

In some implementations, in identifying the new peer, the new peer may be used to store state information from satellites 511-512 and may not be used to execute applications for failed satellite 510. In other implementations, in identifying the new peer, satellite 513 may be configured to execute one or more applications of satellite 510 in accordance with the state information provided by satellites 511 and/or 512 to overcome the failure of satellite 510. Once joined, satellite 513 may further be configured to communicate future state information with satellites 511 and 512.

Figure 10:
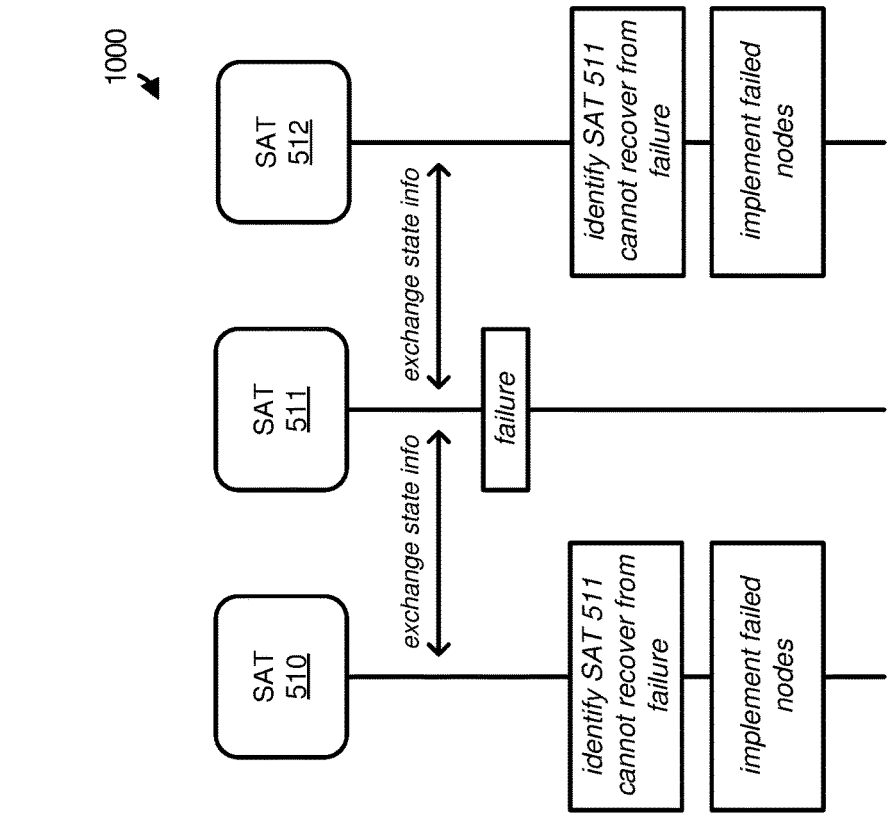
FIG. 10 illustrates a timing diagram of overcoming a failure of a satellite in a satellite system according to an implementation.

FIG. 10 illustrates a timing diagram 1000 of overcoming failure of a satellite in a satellite system according to an implementation. FIG. 10 includes satellites 510-512 from satellite system 500 of FIG. 5.

As depicted, satellites 510-512, which act as a peer satellite group, exchange state information that includes operational state information for at least one application executing thereon, and sensor data information gathered for processing by the at least one application. During the exchange of state information, satellite 511 may encounter a hardware or software failure that prevents execution of at least one application on the satellite. After the failure, satellites 510-511 identify that satellite 511 is incapable of recovery from the failure and initiates implementation of failed application nodes.

In at least one implementation, to identify the failure in satellite 511, satellites 510 and 512 may exchange health check communications with satellite 511. If satellite 511 indicates in one of the communications that a failure has occurred, or fails to communicate a health check communication within a defined time period, satellites 511-512 may identify that a failure has occurred. Once the failure is identified, in implementing the failed nodes, the implementation may occur immediately after identifying the failure, or may occur after a time period has elapsed in relation to the failure. For example, satellite 512 may identify the failure of satellite 511, and hold implementation of the failed nodes until it is determined that satellite 511 is unavailable after a defined time period. Once the time period has elapsed, satellite 512 may implement one or more of the failed applications as virtual nodes.

Although illustrated in the example of FIG. 10 with two satellites implementing the failed nodes from satellite 511, it should be understood that any number of satellites may be used in implementing the failed nodes. For example, satellite 511 may provide state information to satellite 512, permitting satellite 512 to implement the failed application nodes from satellite 511.

Figure 11:
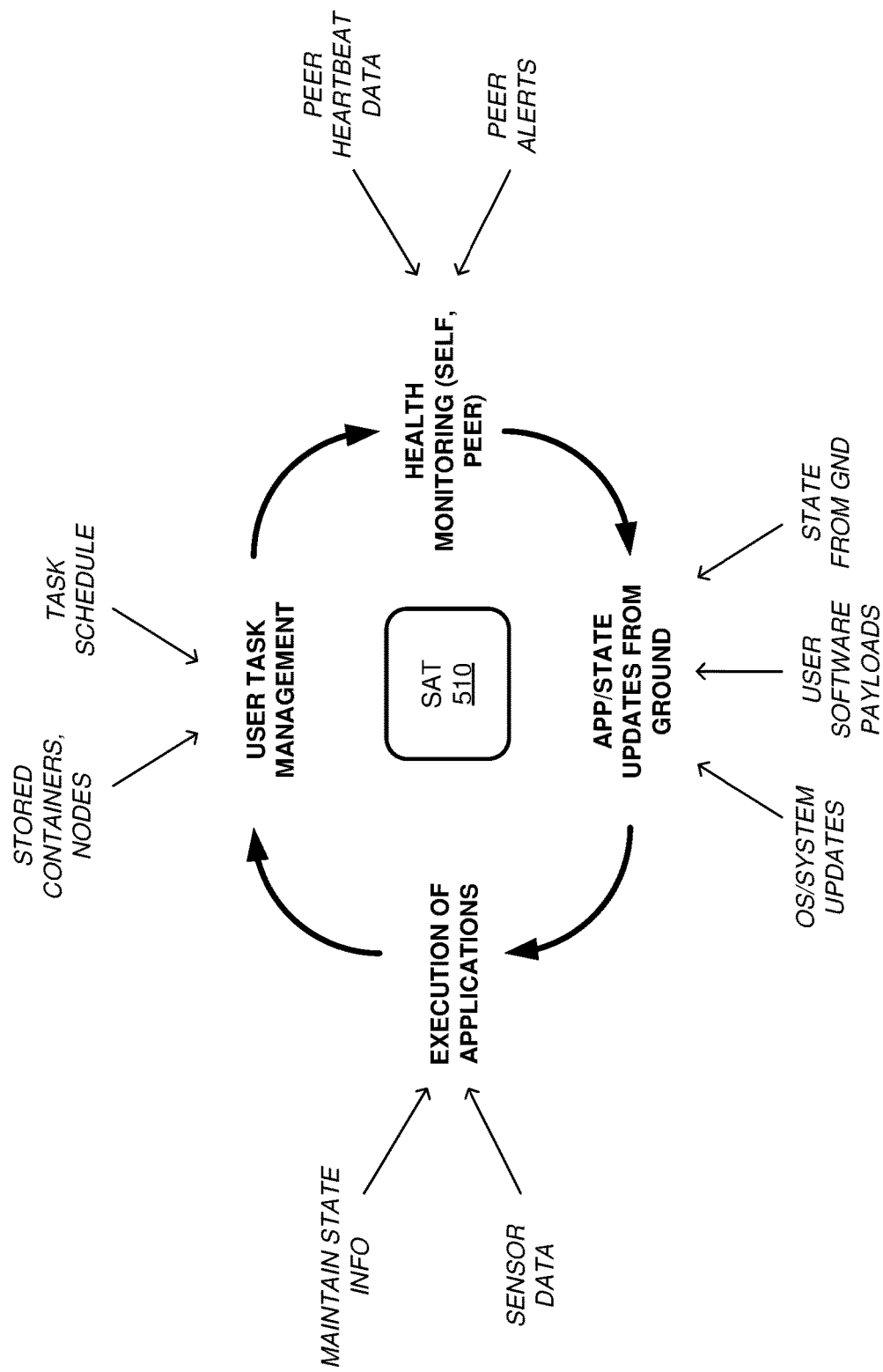
FIG. 11 illustrates a satellite operation according to an implementation.

Referring now to FIG. 11, FIG. 11 illustrates a satellite operation according to an implementation. FIG. 11 includes satellite 510 from satellite system 500 of FIG. 5, although it should be understood that similar operations may occur with any satellites of the satellite platform.

As depicted, satellite 510 is configured to receive application and state information from a ground control system. This application and state information may include updates to the operating system or hypervisor of the virtual machine, user software payloads (applications and updates), and state information, which may include tasks for the application, schedules for the applications, or any other similar information. In addition to the communications with the ground, satellite 510 is further configured to execute applications that are stored in the user space of the satellite, and provide sensor data to each of the applications. These applications execute according to a schedule, which may be provided from the ground control system and implemented by the operating system or hypervisor for the virtual nodes, wherein the schedule allocates resources to each of the applications. These resources may include processing resources as well as sensor resources on the satellite. Further, during the execution of the virtual nodes, satellite 510 is configured to maintain state information for each of the applications. This state information may include the state of processes executing for each application, data gathered for each application, or other similar state information, and may be gathered at defined intervals. In some implementations, the state information may be stored locally on the satellite to recover from hardware or software failures with one or more applications. In some implementations, the state information may be communicated to one or more other peer satellites and/or the ground control system, wherein the state information may be used in recovery during a failure event. This state information may be used to recover satellite 510, or may be used to implement the applications as virtual nodes on the other peer satellites.

As described above, to provide the execution of the applications, an operating system or hypervisor may be used to swap user tasks and manage the allocation of resources to each of the virtual application nodes executing on satellite 510. This scheduling may include time division allocation of resources, such as providing a first application with access to a user sensor for a first time period and providing a second application with access to the same user sensor for a second time period, and may further include physical sharing of resources, such as providing one or more cores to a first virtual node and providing one or more secondary cores to a second virtual node. Although these are just a few examples of allocating resources on a satellite, it should be understood that any combination of time division and physical resource division may be employed based on the schedule provided to the satellite.

In addition to providing a platform for the applications on satellite 510, one or more processes may be dedicated to health monitoring. Similar to the operations described above, satellites may be configured as peers or as a cluster, permitting satellites to monitor the operations on other satellites. This permits satellite 510 to provide health check communications to other satellites, as well as receive notifications or alerts when a failure or issue is detected. In some examples, to identify a failure in a second satellite, satellite 510 may directly receive a notification indicating the failure. In other examples, satellite 510 may fail to receive a "heartbeat" or status notification within a defined time period, and based on the lack of receipt may determine that a failure has occurred in another satellite.

Once a failure is identified for a second satellite, satellite 510 may initiate one or more new virtual nodes to support applications from the second satellite, may provide state information to the second satellite to assist in recovery of the second satellite, may identify a third satellite to be added to the peer group to replace the second satellite, or may provide some combination of the operations.

Figure 12:
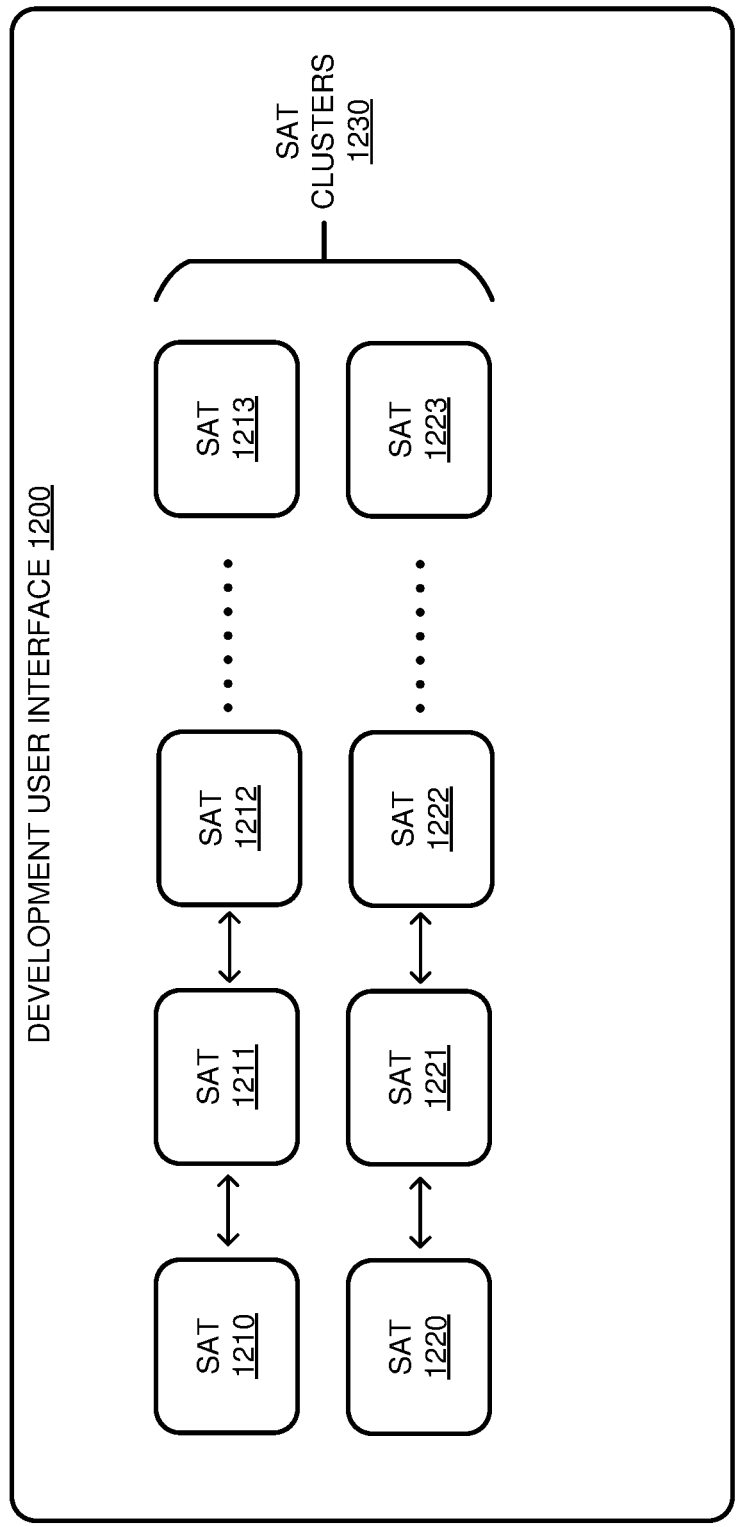
FIG. 12 illustrates a deployment user interface according to an implementation.

FIG. 12 illustrates a deployment user interface 1200 according to an implementation. Deployment user interface 1200 includes satellites 1210-1213 and 1220-1223, which represent satellite clusters for application deployment. Deployment interface 1200 is representative of an interface that could be used in the simulation of deploying an application, or could be used to provide state information about a deployed application.

First, as a simulation interface, development user interface 1200 may be used for testing the functionality of an application, and may further be used to determine if the application passes any verification tests. A developer may deploy the application to one or more of the simulated satellites 1210-1213 and 1220-1223 and monitor the operations of the application over a period of time. If the developer determines that the application is operating as desired, the application may be approved for deployment, and may be deployed to one or more satellites in the physical satellite platform. If, however, the developer determines that modifications are required, the developer may return to the development tool to make changes to the application code. In some examples, the development user interface may be used to provide artificial sensor data to the application to ensure that the application processes are functioning as desired. This artificial sensor data may include imaging data, light measurements, heat measurements, or some other data based on the sensors required by the application.

Second, a similar interface may be provided to an administrator or developer of an application to monitor the deployment of the application in the physical platform. In particular, the satellites in the satellite platform may be configured to provide state information to a ground control system for the platform. This information may include the current operational state of the application (processes running, memory state, storage state, and the like), and may further include information about the sensor data that is being obtained (both processed and unprocessed). Based on the state information, development user interface 1200 may display the state of the application as it is deployed in the framework. For example, if the application were deployed in a satellite cluster comprised of satellites 1210-1213, development user interface 1200 may provide state information for the application on each of the satellites. However, other applications that are co-executing on the same satellite or other satellites of the platform may not be provided to the administrator or developer.

Although illustrated as a user interface in the example of FIG. 12, it should be understood that in some examples the testing and monitoring of the applications may be accomplished via a physical representation of the deployed satellites. This physical representation may include one or more satellite models that can be used to test an application before it is deployed or represent the current state of an application after it is deployed.

Figure 13:
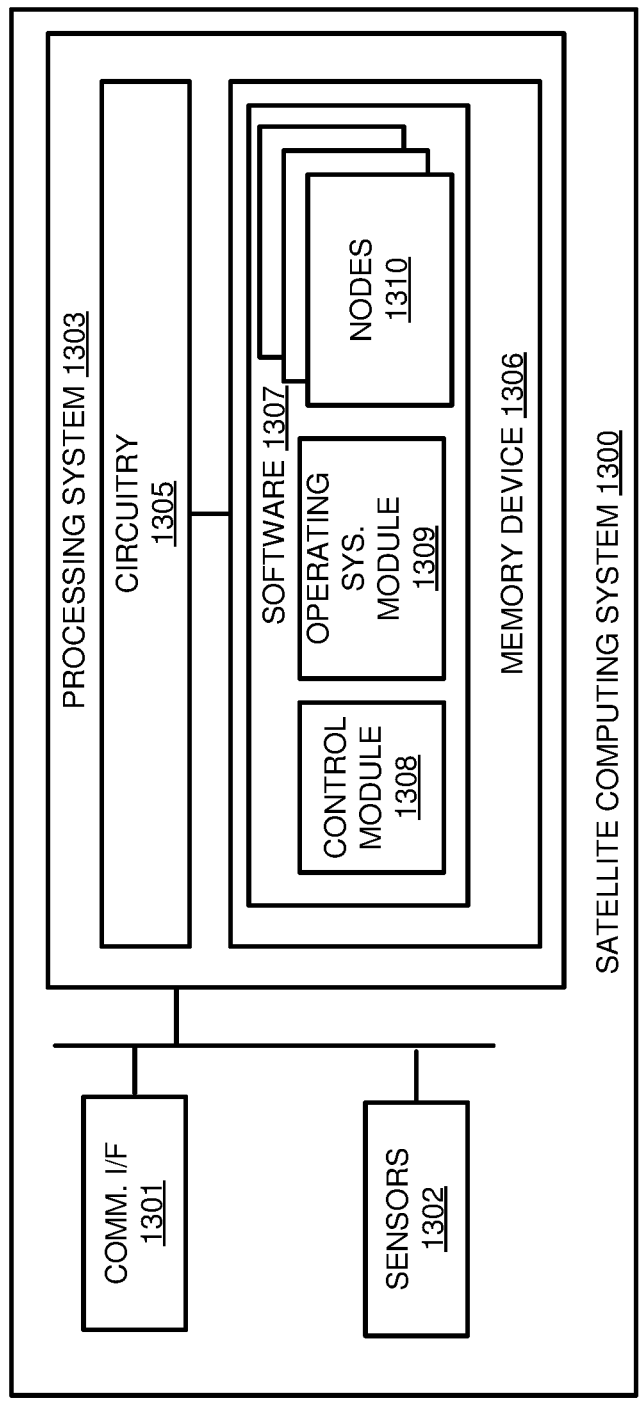
FIG. 13 illustrates a satellite computing system to provide a virtualized satellite application platform according to an implementation.

FIG. 13 illustrates a satellite computing system 1300 to provide a virtualized satellite application platform according to an implementation. Computing system 1300 is representative of any computing system or systems with which the various operational architectures, processes, scenarios, and sequences disclosed herein for a satellite may be implemented. Computing system 1300 is an example of a satellite from FIG. 1 and FIG. 5, although other examples may exist. Computing system 1300 comprises communication interface 1301, sensors 1302, and processing system 1303. Processing system 1303 is linked to communication interface 1301 and sensors 1302. Sensors 1302 may comprise imaging sensors, heat sensors, light sensors, or some other similar type of sensor. Processing system 1303 includes processing circuitry 1305 and memory device 1306 that stores operating software 1307. Computing system 1300 may include other well-known components such as a battery, solar panels, and enclosure that are not shown for clarity.

Communication interface 1301 comprises components that communicate over communication links, such as network cards, ports, radio frequency (RF), processing circuitry and software, or some other communication devices. Communication interface 1301 may be configured to communicate over wireless links. Communication interface 1301 may be configured to use Time Division Multiplex (TDM), Internet Protocol (IP), wireless protocols, communication signaling, or some other communication format—including combinations thereof. In some implementations, communication interface 1301 may communicate with one or more other satellites in a satellite platform and communicate with a ground control system.

Processing circuitry 1305 comprises microprocessor and other circuitry that retrieves and executes operating software 1307 from memory device 1306. Memory device 1306 may include volatile and nonvolatile, removable and non-removable media implemented in any method or technology for storage of information, such as computer readable instructions, data structures, program modules, or other data. Memory device 1306 may be implemented as a single storage device, but may also be implemented across multiple storage devices or sub-systems. Memory device 1306 may comprise additional elements, such as a controller to read operating software 1307. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 1305 is typically mounted on a circuit board that may also hold memory device 1306 and portions of communication interface 1301 and sensors 1302. Operating software 1307 comprises computer programs, firmware, or some other form of machine-readable program instructions. Operating software 1307 includes control module 1308, operating system module 1309, and nodes 1310, although any number of software modules may provide the same operation. Operating software 1307 may further include utilities, drivers, network interfaces, applications, or some other type of software. When executed by processing circuitry 1305, operating software 1307 directs processing system 1303 to operate computing system 1300 as described herein.

In at least one implementation, nodes 1310 may be deployed to satellite computing system 1300 that represent full operating system virtual machines or containers, wherein each node is configured to provide a particular application. To run the nodes, operating system module 1309, which may comprise an operating system and/or a hypervisor, may be executed by processing system 1303, wherein operating system module 1309 provides a platform for nodes 1310. In some implementations, in providing the platform, operating system module 1309 may be configured with a resource schedule, which allocates processing and sensors 1302 to each node in nodes 1310. This allocation of resources, may comprise time division allocation of resources, such as providing a first application with access to a user sensor for a first time period and providing a second application with access to the same user sensor for a second time period, and may further include physical sharing of resources, such as providing one or more cores to a first virtual node and providing one or more secondary cores to a second virtual node.

In addition to executing the applications for each of nodes 1310, operating system module 1309 may further provide a platform for state determination and distribution. This state determination may permit processing system 1303 to identify states for each of the applications and share the states with other satellites and the ground control system. The states may include the operational state of processes within each application node, and/or data states for each of the application nodes. The states may be used in recovery of the various applications executing on satellite computing system 1300, and may further be used in providing enhanced data operations for the applications. For example, an application executing as a node on satellite computing system 1300 may communicate data to a second satellite node. This satellite node may identify second data, using sensors on the second satellite, and combine the data from the first satellite with the second data to provide a particular operation. This operation may include imaging analysis in some examples, where the application can determine whether an object is moving, the type of object, the rate of movement in the object, or some other similar determination based on the combined data.

As an illustrative example, satellite computing system 1300 may use one or more imaging sensors or an imaging system in sensors 1302 to establish state information related to imaging data gathered by the imaging sensors. Once identified, the state information may be communicated to a second satellite device, wherein the second satellite device may employ second imaging sensors to modify the state information with at least imaging data captured by the second imaging sensors. This modification may include positional tracking of at least one ground-based object of interest, or may include a refining analysis of the state information based on the imaging data captured by the second imaging sensors to act as a recognition process for at least one ground-based object of interest.

In some examples, in addition to or in place of exchanging the state information to provide additional analysis on the sensor data, the state information may also be used to provide a backup of satellite computing system 1300. In particular, the state information may be shared with a second satellite device permitting the second satellite device to implement one or more virtual nodes from satellite computing system 1300 when a failure is detected. This implementation or establishment of the one or more virtual nodes may occur directly at the satellite receiving the state information from satellite computing system 1300, or may occur on a third satellite configurable by the satellite receiving the state information from satellite computing system 1300.

Although illustrated in the previous example as providing information to other satellites, it should be understood that satellite computing system 1300 may also be configured to receive state information from other satellites and provide similar operations in accordance with the received state information. These operations may include modifying the state information based on sensors for satellite computing system 1300, or providing backup peering operations based on the state information provided from the secondary satellites.

As also illustrated in FIG. 13, satellite computing system 1300 further includes control module 1308, which is used as a flight control system for the satellite. In particular, control module 1308, which may operate using distinct processing circuitry on satellite computing system 1300, may be responsible for power management and flight control of the satellite. In some examples, control module 1308 may receive requests from nodes 1310 and operating system 1308 to provide data to the applications on nodes 1310. If a request can be accommodated, without comprising the flight of the satellite, control module 1308 may provide the requested data to operating system module 1309 or the corresponding node. In contrast, if it is determined that the information cannot be provided or a flight operation cannot be accommodated, then control module 1308 may fail to provide the data or the flight operation.

Figure 14:
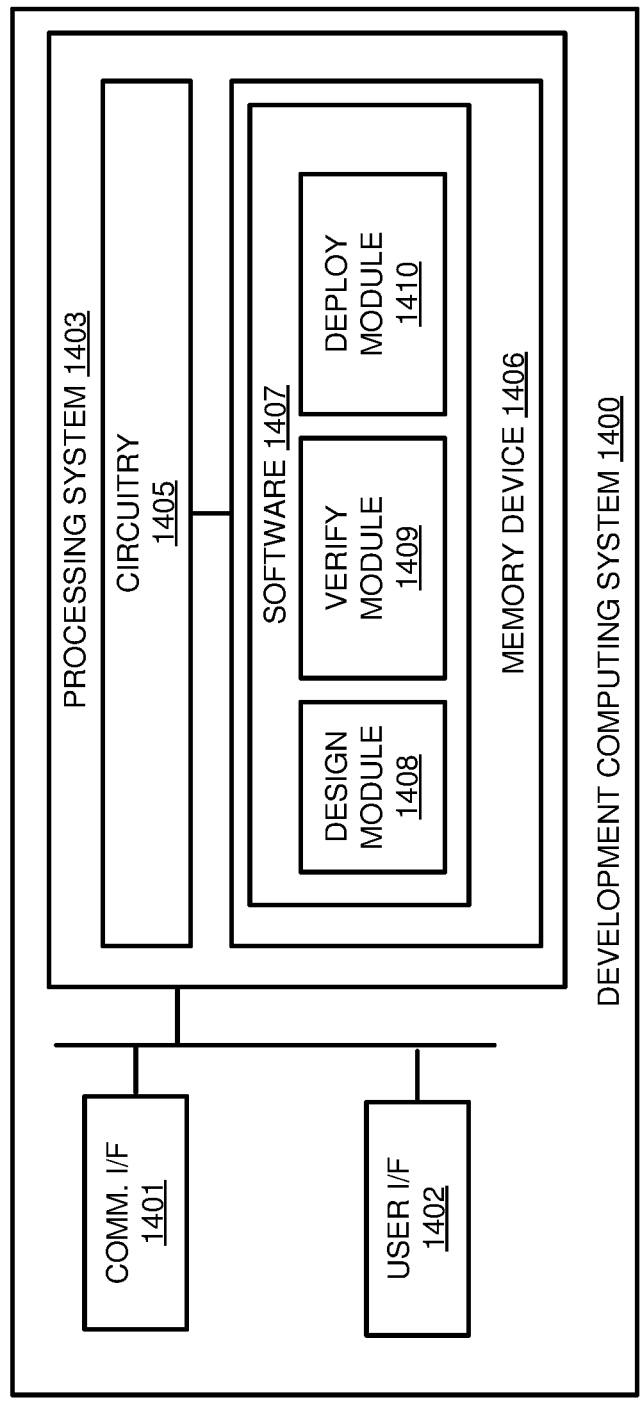
FIG. 14 illustrates a development computing system to generate virtual satellite applications according to an implementation.

FIG. 14 illustrates a development computing system 1400 to generate virtual satellite applications according to an implementation. Computing system 1400 is representative of any computing system or systems with which the various operational architectures, processes, scenarios, and sequences disclosed herein for a ground control system can be implemented. Computing system 1400 is an example of a ground control system from FIG. 1 and FIG. 5, although other examples may exist. Computing system 1400 comprises communication interface 1401, user interface 1402, and processing system 1403. Processing system 1403 is linked to communication interface 1401 and user interface 1402. Processing system 1403 includes processing circuitry 1405 and memory device 1406 that stores operating software 1407. Computing system 1400 may include other well-known components such as a battery, power supply, and enclosure that are not shown for clarity. Computing system 1400 may represent one or more server computing systems, desktop computing systems, laptop computing systems, tablets, or some other computing system, including combinations thereof.

Communication interface 1401 comprises components that communicate over communication links, such as network cards, ports, radio frequency (RF), processing circuitry and software, or some other communication devices. Communication interface 1401 may be configured to communicate over metallic, wireless, or optical links. Communication interface 1401 may be configured to use Time Division Multiplex (TDM), Internet Protocol (IP), Ethernet, optical networking, wireless protocols, communication signaling, or some other communication format—including combinations thereof. In some implementations, communication interface 1401 may be configured to communicate with satellites of a satellite platform to provide applications, updates, and other configuration information, and may further be configured to receive from the satellites state information related to the state of processes for each of the applications and data for the each of the applications.

User interface 1402 comprises components that interact with a user to receive user inputs and to present media and/or information. User interface 1402 may include a speaker, microphone, buttons, lights, display screen, touch screen, touch pad, scroll wheel, communication port, or some other user input/output apparatus—including combinations thereof. User interface 1402 may be omitted in some examples. In some implementations, user interface 1402 may be used to receive developer input to generate a desired application, and test the application within a virtual satellite environment. A display screen may also be used to display state information related to the applications deployed in the physical satellite platform.

Processing circuitry 1405 comprises microprocessor and other circuitry that retrieves and executes operating software 1407 from memory device 1406. Memory device 1406 may include volatile and nonvolatile, removable and non-removable media implemented in any method or technology for storage of information, such as computer readable instructions, data structures, program modules, or other data. Memory device 1406 may be implemented as a single storage device, but may also be implemented across multiple storage devices or sub-systems. Memory device 1406 may comprise additional elements, such as a controller to read operating software 1407. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 1405 is typically mounted on a circuit board that may also hold memory device 1406 and portions of communication interface 1401 and user interface 1402. Operating software 1407 comprises computer programs, firmware, or some other form of machine-readable program instructions. Operating software 1407 includes design module 1408, verify module 1409, and deploy module 1410, although any number of software modules within the application may provide the same operation. Operating software 1407 may further include an operating system, utilities, drivers, network interfaces, applications, or some other type of software. When executed by processing circuitry 1405, operating software 1407 directs processing system 1403 to operate computing system 1400 as described herein.

In at least one implementation, design module 1408 directs processing system 1403 to provide a platform to a developer that permits the developer to generate a new application capable of implementation as a virtual node on a satellite. In some examples, design module 1408 may provide tools and APIs that permit the node to request and receive data from physical sensors, such as imaging, light sensing, temperature sensing, and other similar sensors, and process at least a portion of the data. Design module 1408 may also be used to design an application, wherein different versions of the application, located on different satellites may exchange state information to enhance the ability to identify characteristics within the sensor data.

Once the application is generated using design module 140, verify module 1409 may be used that provides a virtual or physical testing interface for the generated application. This testing interface may include representations of one or more physical satellites, wherein the application can be deployed to the testing satellites to verify the operation of the application. This testing may include providing test data to the applications, testing the applications against failures, amongst other possible testing operations. If the application executes as desired, then the application may be approved for deployment, however, if the application fails to execute as desired, the developer may return to the design module to make modifications to the application.

After testing the application, deploy module 1410 directs processing system 1403 to deploy the application to one or more satellites in the orbiting satellite platform. This deployment may include deploying the application on an uplink directly to each of the required satellites, or may include deploying the application to one or more first satellites that distribute the application to other satellites of the platform.

Here, when deploying the application, deploy module 1410 directs processing system 1403 to determine a resource schedule for the application in relation to other applications in the satellite platform. In at least one implementation, the user may select properties, such as cost, time required for operation of the application, sensors required for the application, and the like. In response to providing the properties, time slots and satellites may be made available to the developer indicating available satellites and times that meet the required properties. From the available satellites and times, the developer may select a schedule for the application, and the application may be deployed to the required satellites for the application.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A satellite device, comprising:
   a communication interface configured to receive software payloads for execution by the satellite device;
   an execution system configured to execute ones of the software payloads deployed on the satellite device as associated virtual nodes that share resources of the satellite device, wherein the software payloads execute independently of a satellite control system of the satellite device that is configured to operate logistical control elements of the satellite device; and
   the execution system configured to transfer state information related to execution of ones of the virtual nodes to at least a peer satellite over the communication interface.

2. The satellite device of claim 1, comprising:
   the execution system configured to execute the ones of the software payloads as the associated virtual nodes on the satellite device according to at least a resource schedule that indicates a timewise allocation of the associated virtual nodes to the resources of the satellite device.

3. The satellite device of claim 2, comprising:
   the communication interface configured to receive the resource schedule and the software payloads over at least one of a ground communication portion and a peer satellite communication portion of the communication interface, wherein the ground communication portion communicates with a ground-based station to receive first ones of the software payloads, and wherein the peer communication portion communicates with at least one other satellite device to receive second ones of the software payloads.

4. The satellite device of claim 2, further comprising:
   one or more sensor systems communicatively coupled with the execution system over associated communication links;
   the execution system configured to provide access for ones of the virtual nodes to the one or more sensor systems as the resources of the satellite device.

5. The satellite device of claim 1, wherein the satellite control system is configured to operate the logistical control elements of the satellite device independent of a state of the execution system; and wherein the logistical control elements comprise one or more of satellite position control elements, satellite inertial control elements, satellite orbital control elements, satellite power control elements, and satellite thermal control elements.

6. The satellite device of claim 1, comprising:
   the execution system comprising a hypervisor system configured to isolate execution and memory resources of the execution system among the ones of the software payloads when executing the associated virtual nodes; and
   the execution system comprising a storage system configured to store at least the ones of the software payloads in an inactive state when not being executed by the execution system.

7. The satellite device of claim 1, comprising:
the execution system configured to receive initial state information from a first satellite device over the communication interface, and process the initial state information to modify the initial state information into the state information for transfer to at least the peer satellite device and further processing by at least the peer satellite device.

8. The satellite device of claim 7, further comprising:
one or more sensor systems communicatively coupled to the execution system, wherein the state information comprises data related to monitored sensor activity of the one or more sensor systems.

9. The satellite device of claim 1, comprising:
the execution system configured to transfer the state information for delivery to the peer satellite device that is configured as a backup to the satellite device;
the communication interface configured to transfer the state information over at least a peer communication portion for delivery to the peer satellite device.

10. The satellite device of claim 1, comprising:
the execution system configured to receive state information related to execution of one or more virtual nodes on a further satellite device;
the execution system configured to establish execution of at least one virtual node on the satellite device in response to receiving the state information, the at least one virtual node continuing at least one activity performed by the further satellite device and indicated in the state information.

11. A method of operating a satellite device, the method comprising:
in a communication interface, receiving software payloads for execution by the satellite device;
in an execution system, executing ones of the software payloads deployed on the satellite device as associated virtual nodes that share resources of the satellite device, wherein the software payloads execute independently of a satellite control system of the satellite device that is configured to operate logistical control elements of the satellite device; and
in the execution system, transferring state information related to execution of ones of the virtual nodes to at least a peer satellite over the communication interface.

12. The method of claim 11, further comprising:
in the execution system, executing the ones of the of software payloads as the associated virtual nodes on the satellite device according to at least a resource schedule that indicates timewise allocations of the associated virtual nodes to the resources of the satellite device.

13. The method of claim 12, further comprising:
in the communication interface, receiving the resource schedule over at least one of a ground communication portion and a peer communication portion, wherein the ground communication portion communicates with a ground-based station to receive first ones of the software payloads, and wherein the peer communication portion communicates with at least one other satellite device to receive second ones of the software payloads.

14. The method of claim 12, further comprising:
in the execution system, providing access for ones of the virtual nodes to one or more sensor systems as the resources of the satellite device according to at least the resource schedule, wherein the one or more sensor systems are communicatively coupled with the execution system over associated communication links.

15. The method of claim 11, wherein the satellite control system is configured to operate the logistical control elements of the satellite device independent of a state of the execution system; and wherein the logistical control elements comprise one or more of satellite position control elements, satellite inertial control elements, satellite orbital control elements, satellite power control elements, and satellite thermal control elements.

16. The method of claim 11, further comprising:
in the execution system, receiving initial state information from a first satellite device over the communication interface, and processing the initial state information to modify the initial state information into the state information for transfer to at least the peer satellite device and further processing by at least the peer satellite device.

17. The method of claim 11, further comprising:
in the execution system, transferring the state information for delivery to the peer satellite device that is configured as a backup to the satellite device;
in the communication interface, transferring the state information over at least a peer communication portion for delivery to the peer satellite device.

18. The method of claim 11, further comprising:
in the execution system, receiving state information related to execution of one or more virtual nodes on a further satellite device;
in the execution system, establishing execution of at least one virtual node on the satellite device in response to receiving the state information, wherein the at least one virtual node continues at least one activity performed by the further satellite device indicated in the state information.

19. A satellite software execution platform for a satellite device, comprising:
one or more non-transitory computer readable storage media;
a processing system operatively coupled with the one or more non-transitory computer readable storage media; and
an execution service comprising program instructions stored on the one or more non-transitory computer readable storage media that, when read and executed by the processing system, direct the processing system to at least:
store software payloads for execution that are received over a communication interface comprising at least a peer communication portion;
execute ones of the software payloads deployed on the satellite device as associated virtual nodes that share resources of the satellite device, wherein the software payloads execute independently of a satellite control system of the satellite device that is configured to operate logistical control elements of the satellite device;
transfer state information related to execution of ones of the virtual nodes to at least a peer satellite over the communication interface.

20. The satellite software execution platform of claim 19, comprising further program instructions, when executed by the processing system, direct the processing system to at least:
receive initial state information from a first satellite device over the communication interface;
establish execution of at least one virtual node on the satellite device in response to receiving the initial state information; and process the initial state information using the at least one virtual node to modify the initial state information into the state information for transfer to at least the peer satellite device and further processing by at least the peer satellite device.

\* \* \* \* \*